Patented June 9, 1953

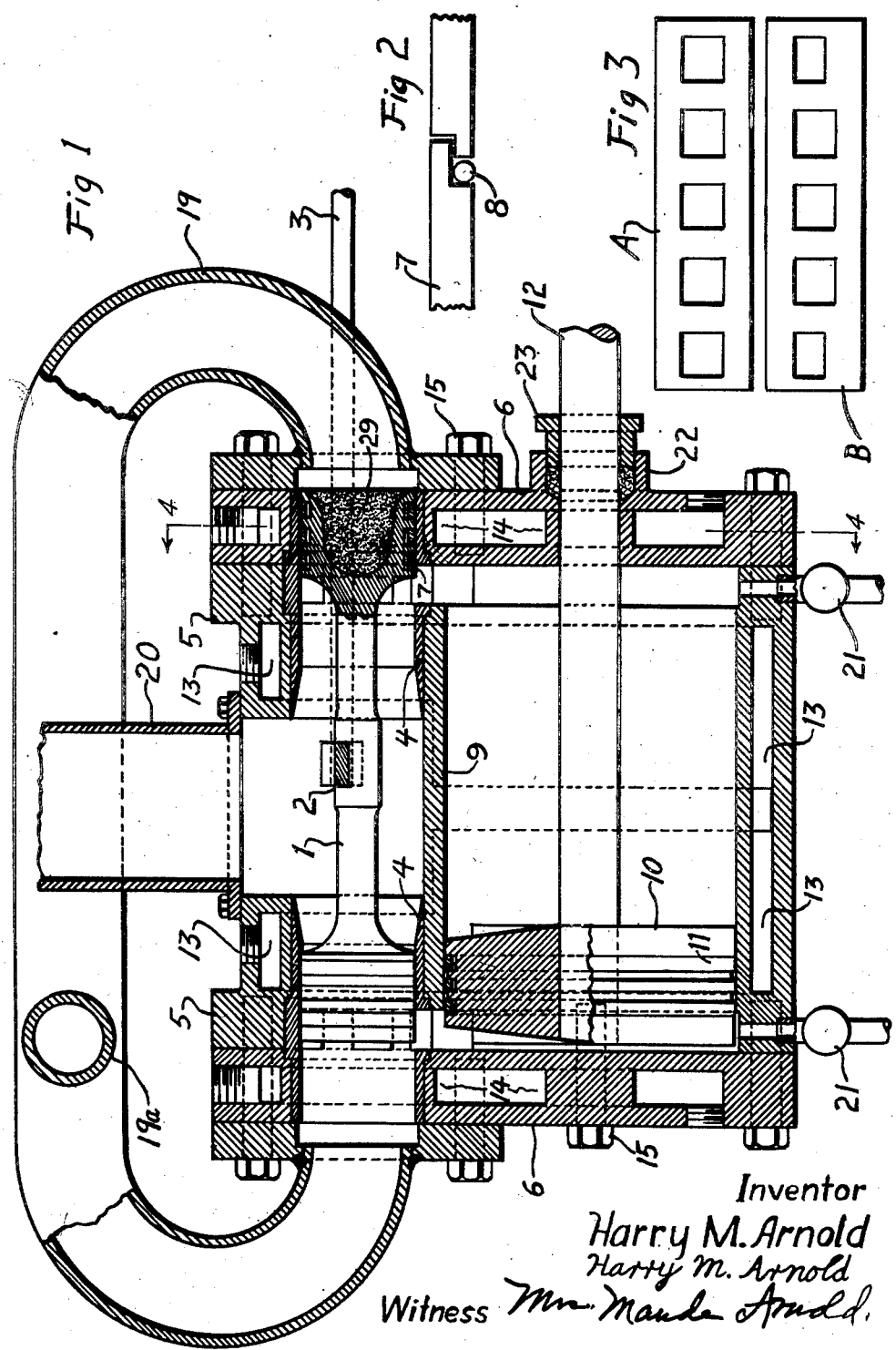

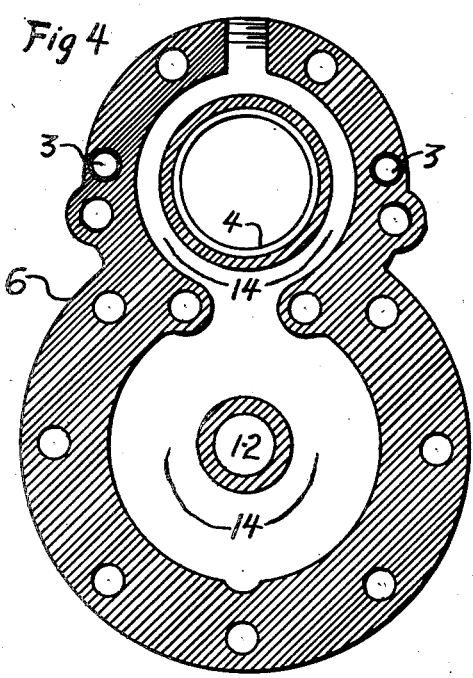
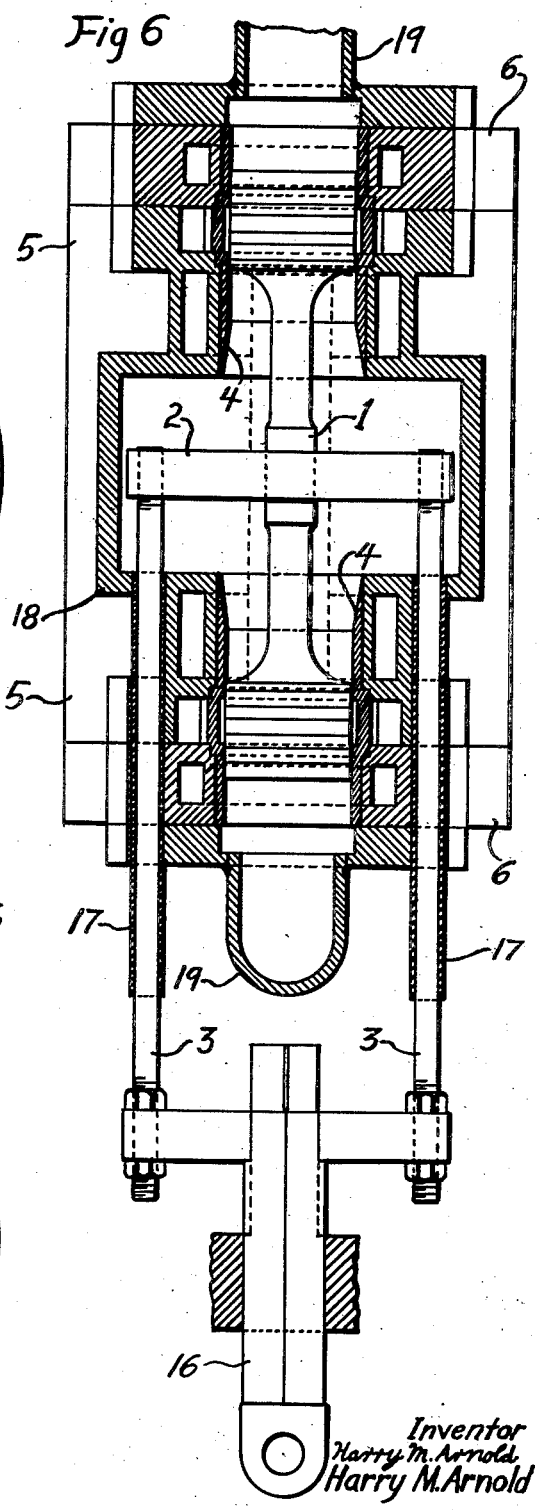
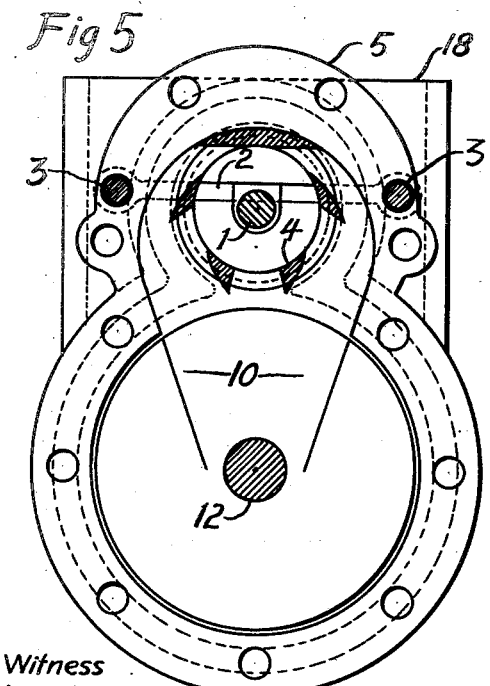

2,641,230

UNITED STATES PATENT OFFICE 2,641,230

OUTSIDE VALVE DRIVE FOR PISTON VALVE AND SLEEVE VALVE STEAM ENGINES

Harry M. Arnold, Denver, Colo.

Application July 1, 1949, Serial No. 102,557

4 Claims. (Cl. 121—165)

This invention relates to an engine using steam and other gases, the general object of the invention being to provide a piston valve construction having large short ports of streamlined flow placed in the ends of the cylinder adjacent the cylinder heads and to provide an outside valve drive which actuates the piston valve through a yoke placed in a valve drive box in the middle of the piston valve chest.

When very highly superheated steam or other hot gases are to be employed, the new outside valve drive becomes necessary. Outside admission and inside exhaust must be used to prevent over heating the valve, but the outside valve drive subjects the valve driving rods and valve rod guides to exhaust pressure and saturation temperature at all times. A moisture seal within the valve rod guides will prevent an appreciable loss of steam.

In order to have ample room for the valve drive box and valve driving yoke in the center of the piston valve chest the piston valve must be unusually long. This is an advantage since the steam ports are located at the ends of the cylinder as illustrated and claimed in my copending patent application No. 193,787 for Port Spool for Piston Valve Engines.

Still another important item to be considered is the distribution of steam behind the piston of the engine when operating at high speed. I provide channels cut into the surface of the piston so the steam has a good chance to distribute itself immediately after the piston starts from either end position.

This invention also consists in certain features of piston ring construction and of a means of doweling the rings onto the piston valve so the free ends of the rings must cross the port belt on one of the bridges. The combination and arrangement of the several parts are hereinafter fully described, illustrated in the accompanying drawings and specifically pointed out in the appended claims.

In describing the invention in detail reference will be had to accompanying drawings wherein like characters denote like or corresponding parts throughout the several views, and in which:

Figure 1 is a longitudinal sectional view of the engine.

Figure 2 is an enlarged fragmentary view of the free ends of a piston ring and showing the use of a dowel pin.

Figure 3 shows two piston valve port belts layed out flat.

Figure 4 is a transverse sectional view of a cylinder head taken on a line 4—4 of Figure 1.

Figure 5 is an end view of the cylinder barrel and cross sectional view of the port spool showing the port construction.

Figure 6 is a longitudinal sectional view through the piston valve chest and valve drive box, showing the arrangement of the outside valve driving mechanism.

In these drawings and referring to Figure 1, the numeral 1 indicates a special form of piston valve having a total length greater than the length of the cylinder barrel and a notch cut into the center of the hub into which the driving yoke 2 is seated. The yoke 2 is actuated by one rod 3 along each outside of the valve chest. A port spool 4 is used in each end of the valve chest. The spools 4 fit partly in the cylinder block 5 and partly in the cylinder heads 6 and are provided with an enlarged hub at the port belt to secure them firmly in proper position. Each end of the piston valve 1 is provided with three piston rings 7. In small size engines free running piston rings will give good results. In medium size engines using the five port design here illustrated it will be necessary to dowel the rings 7 so the free ends of the rings will travel to and fro over the port belt on one of the five bridges to prevent the free ends from dropping into one of the ports and jamming the piston valve. A simple method of doweling a piston ring can be seen in Figure 2. A small pin 8 is fitted into the piston between the free ends of the ring 7.

Figure 3 discloses two types of port belts for the spools 4. In Example A all five ports are of equal width which gives equal admission and equal exhaust for any amount of port opening. Example B shows the two end ports partially closed. When the two upper ports are partly closed on the admission side of the port belt all the incoming steam must enter the cylinder through the three ports nearest the cylinder bore when the engine is operating a short cut-off. When operating a medium cut-off the two upper ports will admit a very small part of the steam. At long cut-off as much as 20% of the incoming steam may enter through the two upper ports.

Referring again to Figure 1 it will be seen the cylinder barrel 9 is fitted with the piston 10 which in turn is equipped with three rings 11. A piston rod 12 is fitted into the piston 10. A tapered channel is cut into each side of the piston 10 at its top. These channels match the steam ports at each end of the cylinder and afford a better distribution of steam behind the piston head the instant the piston begins to move from either extreme position. At extremely high rotative speed in an engine having a small clearance volume at the ends of the cylinder the incoming steam cannot fill in from the steam port quickly and freely without this provision. When very highly superheated steam and other hot gases are used, the engine must be provided with a water jacketing system 13 which surrounds the cylinder barrel 9 and the end portions of the piston valve chest. This system of cooling a steam cylinder is illustrated in my Patent No. 2,194,000 on Superheated Steam Engine and the claim states in part, "said chamber with the valve means being cooled by the water circulating system." The claim also states, "heat non-conducting material covering the end of the piston contacted by the steam." As will be seen, the ends of the piston valve 1 are hollowed out and can be filled with heat non-conducting material 29 so the pistons of the piston valve will not be heated too highly by the incoming superheated steam.

Attention is called to the port spools 4 which have one end fitted into the cylinder heads 6. This constitutes a very important part of the valve seat and the water jackets 14 completely surround the valve seats as illustrated and claimed in my Patent No. 2,464,112 on Cylinder Head for Superheated Steam Engines.

In Figure 4 it will be seen how the water jacket 14 completely encircles the piston rod opening 12 and one end of the port spool 4. The arrangement of the bolt holes for the bolts 15 is clearly shown.

Figure 5 discloses the simple but streamlined construction of the port spool 4. An accurately machined port circle is provided in the ends of the cylinder block 5 and the steam enters and leaves the cylinder over smooth surfaces and encounters gradual turns when entering and leaving the piston valve chest. Obviously, the three lower port openings in the port spool 4 handle the main body of the steam but it is so directed into the piston valve chest that a good radial distribution about the piston valve 1 is obtained. The tapered channel in the piston 10 matches the cylinder port opening. Details of the valve driving yoke 2 and valve rods 3 can be seen. The port capacity of these designs is 10.2% of the piston area and the total clearance volume is 5% of the piston displacement. A well known oil well steam engine for heavy duty work has 6.6% port capacity and 12% total clearance volume. In medium size engines the total clearance volume will run as low as 4% while large size engines can have as little as 3% and still have ample port capacity for high speed operation. In large size engines more than five ports in the port spools 4 will be required but the best flow will be obtained with a small number of port openings. It will be noted the port openings into the valve chest are nearly as wide as they are long. A square opening gives the greatest flow per unit of area in a piston valve port.

Figure 6 reveals the details of the outside valve driving mechanism. Motion is imparted by an eccentric or other means to the cross-head 16 which in turn is fastened to the drive rods 3. The rods 3 extend through long tubular valve guides 17 to the inside of the valve drive box 18 where they impart their motion to the driving yoke 2. The yoke 2 fits into a slot provided in the hub of the piston valve 1. With this mechanism no valve rod extends from either end of the piston valve 1 through the high temperature and high pressure manifold 19. It is not possible to hold packing around a valve rod when both high pressure and very high temperatures are present.

Referring for the third time to Figure 1 it will be pointed out the steam enters the manifold 19 at a convenient point 19a and is conducted to both ends of the piston valve chest and feeds directly against the ends of the piston valve 1. In the position shown the piston valve 1 is admitting some steam behind the piston 10 at the head end of the cylinder while the ports at the crank end are in communication with the exhaust outlet 20. Drain valves 21 are placed at each end of the cylinder bore 9 for blowing out water which may accumulate when the engine is being warmed up. A packing gland 22 surrounds the piston rod 12 and the packing is held in position by the insert 23.

This improved engine promotes expansion of very high temperatures by superheated steam because most of the heat losses from the steam are prevented while the steam is entering the cylinder. Experience has shown that in a reciprocating engine operating at high piston speed, the steam enters the cylinder and expands in a very small fraction of one second. When highly superheated steam is employed only a very small amount of the steam adjacent the cylinder barrel will have time to cool and condense. The resulting loss in mean effective pressure on the piston is very small as compared with the great loss of mean effective pressure resulting from condensation and resistance to the flow of steam through the ports in the conventional reciprocating engine using saturated steam.

While the drawings show the invention applied to an engine of the type shown in Figure 1, it will of course, be understood that the invention can be used with other types of engines such as the single acting engine as well as in cylinder constructions embodying two or more cylinders in one cylinder block.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. In a piston valve or sleeve valve engine of the reciprocating piston type having a cylinder block and piston valve mounted therein, valve driving means comprising a closed valve drive chamber in the block, said piston having a hub located in the chamber, a yoke connected to said valve hub, a pair of drive rods parallel to the axis of the piston valve, a pair of guides located outside of the valve drive chamber, said drive rods being slidably mounted in said guides and connected within the said valve drive chamber to said yoke, and reciprocated means connected to the free ends of the drive rods imparting reciprocating movement to said rods, yoke and piston valve.

2. In a piston valve or sleeve valve engine of the reciprocating piston type having a cylinder block and piston valve mounted therein, valve driving means comprising a closed valve drive chamber in the block, said piston having a notched hub located in the chamber, a yoke connected between its ends to said notched valve hub, a pair of drive rods parallel to the axis of the piston valve, a pair of tubular guides located outside of the valve drive chamber at opposite sides of said valve, said drive rods being slidably mounted in said guides and connected within the said valve drive chamber to said yoke, and reciprocated means connected to the free ends of the drive rods imparting reciprocating movement to said rods, yoke and piston valve.

3. In a piston valve or sleeve valve engine of the reciprocating piston type having a cylinder block and piston valve mounted therein, valve driving means comprising a closed valve drive chamber in the block, said piston having a notched hub located in the chamber, a yoke connected between its ends to said notched valve hub, a pair of drive rods parallel to the axis of the piston valve, a pair of tubular guides located outside of the valve drive chamber at opposite sides of said valve, said drive rods being slidably mounted in said guides and connected within the said valve drive chamber to said yoke, and reciprocated means comprising a cross piece adjustably connected to the free ends of the drive rods imparting reciprocating movement to said rods, yoke and piston valve.

4. In a piston valve or sleeve valve engine of the reciprocating piston type having a cylinder block and piston valve mounted therein, valve driving means comprising a closed valve drive chamber in the block, said piston having a hub located in the chamber, a yoke connected between its ends to said valve hub, a pair of drive rods parallel to the axis of the piston valve, a pair of tubular guides located outside of the valve drive chamber at opposite sides of said valve and communicating at one end with said valve drive chamber, said drive rods being slidably mounted in said tubular guides and connected within the said valve drive chamber to said yoke, and reciprocated means located outside of the cylinder block connected to the free ends of the drive rods imparting reciprocating movement to said rods, yoke and piston valve.

HARRY M. ARNOLD.

References Cited in the file of this patent

UNITED STATES PATENTS

| Number | Name | Date |
|---|---|---|
| 797,309 | Needham et al. | Aug. 15, 1905 |
| 1,051,602 | Lefer | Jan. 28, 1913 |

FOREIGN PATENTS

| Number | Country | Date |
|---|---|---|
| 13,668 | Sweden | Nov. 10, 1900 |
| 145,006 | Germany | Nov. 5, 1903 |